United States Patent
Shimada

(10) Patent No.: US 10,181,691 B2
(45) Date of Patent: Jan. 15, 2019

(54) PRODUCTION METHOD FOR TERMINAL-EQUIPPED ELECTRICAL WIRE, CRIMP TOOL, AND TERMINAL-EQUIPPED ELECTRICAL WIRE

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventor: Takanobu Shimada, Yokkaichi (JP)

(73) Assignees: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/765,010

(22) PCT Filed: Oct. 4, 2016

(86) PCT No.: PCT/JP2016/079410
§ 371 (c)(1),
(2) Date: Mar. 30, 2018

(87) PCT Pub. No.: WO2017/068963
PCT Pub. Date: Apr. 27, 2017

(65) Prior Publication Data
US 2018/0294612 A1  Oct. 11, 2018

(30) Foreign Application Priority Data
Oct. 21, 2015  (JP) .................................. 2015-207201

(51) Int. Cl.
*H01R 43/048* (2006.01)
*H01B 7/00* (2006.01)
(Continued)

(52) U.S. Cl.
CPC ............. *H01R 43/048* (2013.01); *H01B 7/00* (2013.01); *H01B 13/00* (2013.01); *H01R 4/18* (2013.01);
(Continued)

(58) Field of Classification Search
CPC ............................. H01R 43/058; H01R 43/048
See application file for complete search history.

(56) References Cited

U.S. PATENT DOCUMENTS 2,600,012 A * 6/1952 Macy .................. H01R 4/2495
                                                     24/115 A
2,818,632 A * 1/1958 Hammell ................. H01R 4/00
                                                     174/75 R
(Continued)

FOREIGN PATENT DOCUMENTS

JP       2009295333 A     12/2009

OTHER PUBLICATIONS

International Search Report for Application No. PCT/JP2016/079410 dated Dec. 27, 2016; 5 pages.

*Primary Examiner* — Ross N Gushi
(74) *Attorney, Agent, or Firm* — Reising Ethington, P.C.

(57) ABSTRACT

A production method for a terminal-equipped electrical wire in which a terminal including a bottom plate portion and a pair of wire barrels extending sideward from the bottom plate portion is crimped to a core wire exposed at an end of an electrical wire, includes: a step of placing the core wire on the bottom plate portion; and a step of allowing the wire barrels to surround the core wire and be crimped to the core wire using a crimp tool, wherein the crimp tool includes a (Continued)

first tool having a placement face on which the bottom plate portion and the core wire are placed, and a second tool having a curved face for holding and curving the wire barrels between the curved face and the placement face, and a surface roughness Ra2 of the curved face is larger than a surface roughness Ra1 of the placement face (Ra2>Ra1).

5 Claims, 10 Drawing Sheets

(51) Int. Cl.
  *H01B 13/00* (2006.01)
  *H01R 4/18* (2006.01)
  *H02G 1/14* (2006.01)

(52) U.S. Cl.
  CPC ............... *H01R 4/185* (2013.01); *H02G 1/14* (2013.01); *H01B 7/0009* (2013.01)

(56) References Cited

U.S. PATENT DOCUMENTS

| | | | | | |
|---|---|---|---|---|---|
| RE24,510 E | * | 8/1958 | Macy | ...................... | H01R 4/20 439/421 |
| 3,098,517 A | * | 7/1963 | Zimmerman, Jr. | ...... | H01R 4/20 72/397 |
| 3,146,519 A | * | 9/1964 | Redwine | .............. | H01R 43/058 174/84 C |
| 4,991,289 A | * | 2/1991 | French | ................. | H01R 43/058 29/519 |
| 5,025,554 A | * | 6/1991 | Dohi | ...................... | H01R 4/187 29/860 |
| 5,084,963 A | * | 2/1992 | Murray | ................ | H01R 43/042 174/7 |
| 5,353,625 A | * | 10/1994 | Hoshino | .............. | H01R 43/048 29/753 |
| 5,414,926 A | * | 5/1995 | Ito | ........................ | H01R 43/048 29/753 |
| 5,486,653 A | * | 1/1996 | Dohi | ...................... | H01R 4/185 174/84 C |
| 5,500,999 A | * | 3/1996 | Yagi | ..................... | H01R 43/058 29/751 |
| 5,561,267 A | * | 10/1996 | Fudoo | ................... | H01R 4/185 174/84 C |
| 6,098,443 A | * | 8/2000 | Muller | .................. | H01R 4/184 29/753 |
| 6,113,441 A | * | 9/2000 | Fukase | ............... | H01R 43/0486 439/877 |
| 6,193,138 B1 | * | 2/2001 | Wada | ................... | H01R 43/048 228/115 |
| 6,658,725 B1 | * | 12/2003 | Liu | ...................... | H01R 43/058 29/33 M |
| 6,813,826 B2 | * | 11/2004 | Ito | ........................ | H01R 43/058 29/748 |
| 6,880,240 B2 | * | 4/2005 | Kitagawa | ............. | H01R 43/048 29/751 |
| 7,409,847 B2 | * | 8/2008 | Wightman | ........... | H01R 43/058 29/283.5 |
| 7,493,791 B2 | * | 2/2009 | Chadbourne | ........ | H01R 43/058 72/409.19 |
| 7,494,388 B2 | * | 2/2009 | Kakuta | ................... | H01R 4/185 439/877 |
| 7,748,109 B2 | * | 7/2010 | Yagi | ..................... | H01R 43/048 29/463 |
| 7,775,842 B2 | * | 8/2010 | Yamagami | ........... | H01R 43/058 439/877 |
| 7,784,176 B2 | * | 8/2010 | Yagi | ..................... | H01R 43/048 29/751 |
| 7,985,923 B2 | * | 7/2011 | Yagi | ................... | H01R 43/0486 174/84 C |
| 8,167,666 B2 | * | 5/2012 | Koga | ..................... | H01R 4/185 439/595 |
| 8,813,341 B2 | * | 8/2014 | Kaufmann | ............. | H01R 4/183 29/505 |
| 8,819,925 B2 | * | 9/2014 | Onuma | .............. | H01R 43/0486 29/753 |
| 8,826,523 B2 | * | 9/2014 | Takahashi | ............... | H01R 4/185 29/751 |
| 8,984,925 B2 | * | 3/2015 | Battenfeld | ........... | H01R 43/058 72/412 |
| 9,048,606 B2 | * | 6/2015 | Shinmi | .................. | H01R 4/184 |
| 9,088,079 B2 | * | 7/2015 | Kumakura | ............. | H01R 4/185 |
| 9,106,040 B2 | * | 8/2015 | Morikawa | ............. | H01R 4/184 |
| 9,325,135 B2 | * | 4/2016 | Bauer | ..................... | B23K 26/22 |
| 9,385,449 B2 | * | 7/2016 | Peters | .................... | H01R 4/203 |
| 9,543,726 B2 | * | 1/2017 | Sugimoto | ............ | H01R 43/048 |
| 9,698,553 B2 | * | 7/2017 | Sugimoto | ............ | H01R 43/048 |
| 10,014,599 B2 | * | 7/2018 | Baldauf | ................ | H01R 9/0518 |
| 2002/0189095 A1 | * | 12/2002 | Ito | ........................ | H01R 43/058 29/861 |
| 2005/0026515 A1 | | 2/2005 | Hashimoto et al. | | |
| 2008/0172864 A1 | * | 7/2008 | Yagi | ..................... | H01R 43/048 29/753 |
| 2008/0307934 A1 | * | 12/2008 | Coe | .......................... | B25B 7/02 72/409.16 |
| 2009/0163088 A1 | * | 6/2009 | Yamagami | ............. | H01R 4/185 439/878 |
| 2010/0242568 A1 | * | 9/2010 | Battenfeld | ............... | B21J 13/02 72/407 |
| 2011/0094797 A1 | * | 4/2011 | Otsuka | ............... | H01R 43/0207 174/84 C |
| 2011/0136397 A1 | * | 6/2011 | Koga | ................... | H01R 4/185 439/877 |
| 2013/0104392 A1 | * | 5/2013 | Morikawa | ............. | H01R 4/184 29/753 |
| 2018/0183198 A1 | * | 6/2018 | Sowa | ................... | H01R 43/058 |
| 2018/0294612 A1 | * | 10/2018 | Shimada | ............ | H01R 43/048 |

* cited by examiner

PRODUCTION METHOD FOR TERMINAL-EQUIPPED ELECTRICAL WIRE, CRIMP TOOL, AND TERMINAL-EQUIPPED ELECTRICAL WIRE

CROSS REFERENCE TO RELATED APPLICATIONS

This application claims the priority of Japanese patent application JP2015-207201 filed on Oct. 21, 2015, the entire contents of which are incorporated herein.

TECHNICAL FIELD

A technique disclosed in this specification relates to a production method for a terminal-equipped electrical wire, a crimp tool, and a terminal-equipped electrical wire.

BACKGROUND ART

Conventionally, an electrical wire and a terminal are connected to each other by crimping wire barrels of the terminal to a core wire exposed at an end of the electrical wire. Wire barrels are crimped to a core wire in this manner using a crimp tool. Specifically, a core wire is laid over wire barrels placed on a base member, and a crimp tool is lowered toward the base member, so that the entirety of the wire barrels gradually deform so as to surround the core wire along the shape of the crimp tool, and ends of the wire barrels bite into the core wire. An example of known prior art is JP 2005-50736A

SUMMARY

However, if wire barrels are crimped to a core wire using a crimp tool, there are cases where stress is concentrated on the wire barrels at portions thereof in contact with ends of the crimp tool (ends in the terminal axial direction), and, as shown in FIGS. 9 and 10, a core wire 100 that has been compressed is pushed upward, and the terminal 101 is locally extended and portions 101T that are thinner than other portions are formed.

It is an object of a technique disclosed in this specification to provide a terminal-equipped electrical wire in which the terminal is prevented from being partially thin.

A technique disclosed in this specification is directed to a production method for a terminal-equipped electrical wire in which a terminal including a bottom plate portion and a pair of wire barrels extending sideward from the bottom plate portion is crimped to a core wire exposed at an end of an electrical wire, including: a step of placing the core wire on the bottom plate portion; and a step of allowing the wire barrels to surround the core wire and be crimped to the core wire using a crimp tool, wherein the crimp tool includes a first tool having a placement face on which the bottom plate portion and the core wire are placed, and a second tool having a curved face for holding and curving the wire barrels between the curved face and the placement face, and a surface roughness Ra2 of the curved face is larger than a surface roughness Ra1 of the placement face (Ra2>Ra1).

Furthermore, a crimp tool for use in production of a terminal-equipped electrical wire in which a terminal including a bottom plate portion and a pair of wire barrels extending sideward from the bottom plate portion is crimped to a core wire exposed at an end of an electrical wire, the crimp tool for crimping the pair of wire barrels to the core wire, includes: a first tool having a placement face on which the bottom plate portion and the core wire are placed; and a second tool having a curved face for curving the wire barrels between the curved face and the placement face, wherein a surface roughness Ra2 of the curved face is larger than a surface roughness Ra1 of the placement face (Ra2>Ra1).

According to the terminal-equipped electrical wire production method and the crimp tool described above, the surface roughness Ra2 of the curved face of the second tool is larger than the surface roughness Ra1 of the placement face of the first tool, and thus, when the curved face is brought into contact with the wire barrels, the curved face comes into close contact with the entirety of the wire barrels in a state in which slipping is unlikely to occur due to the frictional force thereof, and presses the entirety of the wire barrels with a uniform force. Accordingly, the terminal is prevented from being partially thin due to stress concentrated at the ends of the curved face (the ends in the axial direction of the terminal), and thus it is possible to provide a terminal-equipped electrical wire of high quality.

It is preferable that the surface roughness Ra2 of the curved face is $0.2 \leq Ra2 \leq 1.0$ µm. The reason for this is that, if Ra2 is smaller than 0.2 µm, sufficient effects may not be obtained due to an insufficient frictional force, and, if Ra2 is larger than 1.0 µm, the surface of the wire barrels may be made rough.

Furthermore, a terminal-equipped electrical wire produced using the terminal-equipped electrical wire production method and the crimp tool described above is such that a surface roughness Ra3 of barrel outer faces of the wire barrels on the side opposite to the core wire is larger than a surface roughness Ra4 of a bottom plate outer face of the bottom plate portion on the side opposite to the core wire (Ra3>Ra4). This terminal-equipped electrical wire is of high quality because the terminal is prevented from being partially thin.

Furthermore, a technique disclosed in this specification is directed to a production method for a terminal-equipped electrical wire in which a terminal including a bottom plate portion and a pair of wire barrels extending sideward from the bottom plate portion is crimped to a core wire exposed at an end of an electrical wire, including: a step of placing the core wire on the bottom plate portion; and a step of allowing the wire barrels to surround the core wire and be crimped to the core wire using a crimp tool. The crimp tool includes a first tool having a placement face on which the bottom plate portion and the core wire are placed, and a second tool having a curved face for holding and curving the wire barrels between the curved face and the placement face, a surface roughness Ra1 of the placement face is the same as a surface roughness Ra2 of the curved face (Ra1=Ra2), and $0.2 \leq Ra2 \leq 1.0$ µm.

Furthermore, a crimp tool for use in production of a terminal-equipped electrical wire in which a terminal including a bottom plate portion and a pair of wire barrels extending sideward from the bottom plate portion is crimped to a core wire exposed at an end of an electrical wire, the crimp tool for crimping the pair of wire barrels to the core wire, includes: a first tool having a placement face on which the bottom plate portion and the core wire are placed; and a second tool having a curved face for curving the wire barrels between the curved face and the placement face, wherein a surface roughness Ra1 of the placement face is the same as a surface roughness Ra2 of the curved face (Ra1=Ra2), and $0.2 \leq Ra2 \leq 1.0$ µm.

Even when the surface roughness Ra1 of the placement face is the same as the surface roughness Ra2 of the curved face in this manner, if $0.2 \leq Ra2 \leq 1.0$ µm, these surface roughnesses are sufficiently larger than an ordinary surface roughness Ra=0.05 μm of conventional crimp tools, and thus slippage between the crimp tool and the terminal is suppressed due to the frictional force thereof. That is to say, a large amount of stress is prevented from being partially applied to the terminal, and thus it is possible to obtain a terminal-equipped electrical wire of high quality.

Note that the surface roughness Ra described in this specification is a center line average roughness as defined in Appendix of JIS B 0031 and JIS B 0061.

According to a technique disclosed in this specification, it is possible to provide a terminal-equipped electrical wire in which a crimp portion crimped to the electrical wire is prevented from being partially thin.

DESCRIPTION OF EMBODIMENTS

Embodiment 1

Figure 1:
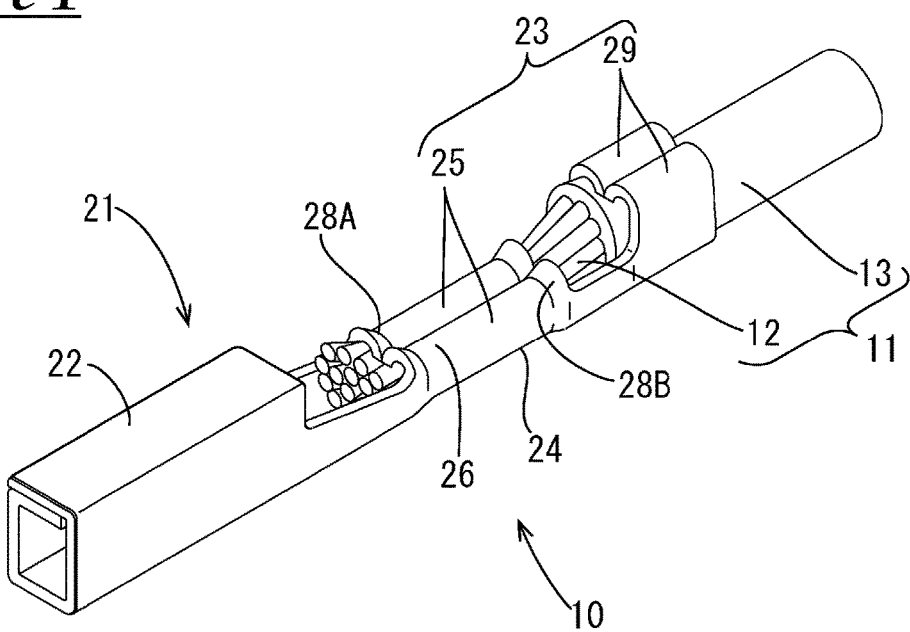
FIG. 1 is a perspective view of a terminal-equipped electrical wire of Embodiment 1.

Hereinafter, Embodiment 1 will be described with reference to FIGS. 1 to 5. In the description below, the lower left in FIG. 1 is taken as the front, the upper right is taken as the rear, the upper portion is taken as the upper side, and the lower portion is taken as the lower side. Furthermore, the direction from the lower right to the upper left in FIG. 1 is taken as the left-right direction (width direction).

A terminal-equipped electrical wire 10 of this embodiment is produced by crimping a female terminal 21 to an end of an electrical wire 11 using a crimp tool 30.

As shown in FIG. 1, the terminal-equipped electrical wire 10 has the electrical wire 11, and the female terminal 21 crimped to an end of the electrical wire 11.

The electrical wire 11 has a core wire 12 obtained by twisting metal thin wires together into a helical shape, and a resin insulating sheath 13 covering the core wire 12. The insulating sheath 13 is stripped off at an end of the electrical wire 11, so that the core wire 12 is exposed. In this embodiment, the core wire 12 is made of aluminum or an aluminum alloy.

The female terminal 21 is a member produced by punching and bending a metal plate member. Examples of a metal plate member from which the female terminal 21 is made include a plate member made of copper or a copper alloy whose surface is tin-plated.

As shown in FIG. 1, the female terminal 21 includes a terminal connection portion 22 that is to be connected to a corresponding terminal, and an electrical wire connection portion 23 that is to be crimped to an end of the electrical wire 11. The terminal connection portion 22 is a portion in the shape of a rectangular tube into which a male tab of a corresponding terminal (not shown) is placed.

The electrical wire connection portion 23 includes a bottom plate 24 (an example of a bottom plate portion) that is continuous from the terminal connection portion 22, a pair of wire barrels 25 that are continuous from the bottom plate 24, and a pair of insulation barrels 29 that are continuous from the bottom plate 24. The bottom plate 24 is an elongated plate-like portion extending rearward from the rear end of the terminal connection portion 22, and is arranged along the electrical wire 11.

The pair of wire barrels 25 are portions extending sideward (in directions that intersect the direction in which the electrical wire 11 extends) from the bottom plate 24, and are arranged so as to surround the core wire 12 exposed from the insulating sheath 13 at an end of the electrical wire 11. The pair of wire barrels 25 are arranged so as to face each other, and are crimped to the core wire 12 so as to press the core wire 12 against the bottom plate 24.

The wire barrels 25 crimped to the core wire 12 include main body portions 26 that come into close contact with the core wire 12 arranged at the center in the front-rear direction, front tapered portions 28A spreading outward from the front end of the main body portions 26, and rear tapered portions 28B spreading outward from the rear end of the main body portions 26.

Each main body portion 26 of the pair of wire barrels 25 is arranged so as to face the other main body portion 26, is curved toward the core wire 12 so as to approach the other main body portion 26, and is bent such that an end thereof (an end opposite to the bottom plate 24) bites into the core wire 12. This end faces an end of the other main body portion 26.

Meanwhile, the pair of insulation barrels 29 are portions extending sideward (in directions that perpendicularly intersect the direction in which the electrical wire 11 extends) from the bottom plate 24, on the rear side of the wire barrels 25, and are crimped to the insulating sheath 13 of the electrical wire 11.

Figure 2:
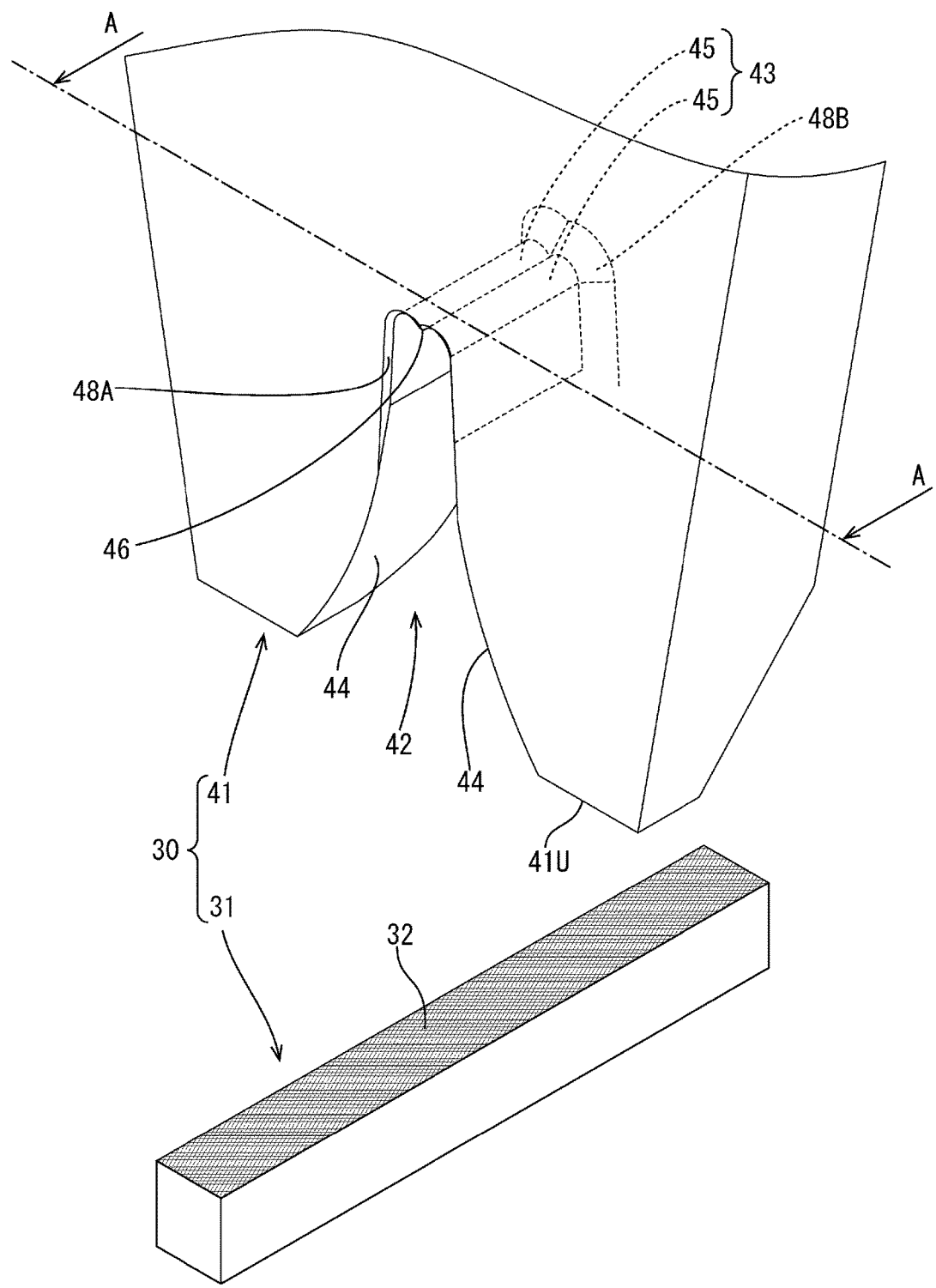
FIG. 2 is a perspective view of a crimp tool of Embodiment 1.

As shown in FIG. 2, the crimp tool 30 includes an anvil 31 (an example of a first tool) and a crimper 41 (an example of a second tool). The anvil 31 is a base member on which the female terminal 21 can be placed. The crimper 41 is a member that is arranged so as to face the anvil 31, and is used to hold and curve the wire barrels 25 between the anvil 31 and the crimper 41, thereby crimping the wire barrels 25 to the core wire 12.

The anvil 31 is a base member made of metal, and, as shown in FIG. 2, an upper face thereof functions as a placement face 32 on which the female terminal 21 can be placed. In this embodiment, the placement face 32 has a surface roughness Ra1=0.05 μm as in conventional examples.

As shown in FIG. 2, the crimper 41 is a thick plate-like member made of metal and is arranged above the anvil 31 so as to face the anvil 31. The crimper 41 has lower faces 41U arranged parallel to the placement face 32 of the anvil 31.

The crimper 41 has a barrel pressing portion 42. The barrel pressing portion 42 is a tunnel-like portion extending in the front-rear direction, into which the female terminal 21 and the anvil 31 are partially placed when the female terminal 21 is crimped to the electrical wire 11, and is recessed upward (to the side opposite to the anvil 31) relative to the lower faces 41U.

The inner wall of the barrel pressing portion 42 has a top wall portion 43 (an example of a curved face), a pair of side wall portions 44, and two tapered wall portions 48A and 48B.

Figure 3:
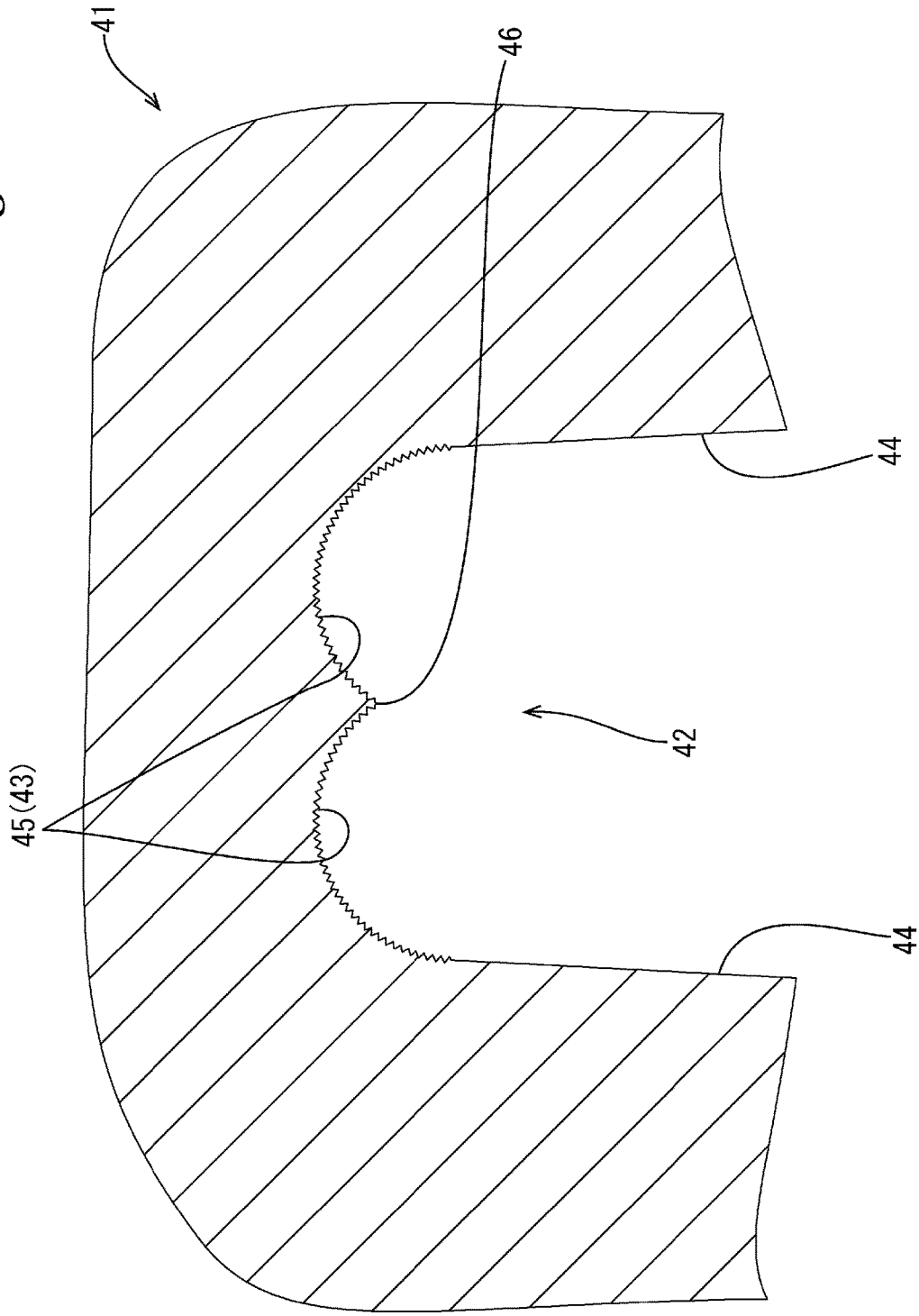
FIG. 3 is a cross-sectional view taken along A-A of FIG. 2.

The top wall portion 43 is a wall portion that is spaced away from and is on the upper side of the lower faces 41U (opposite to the anvil 31). As shown in FIGS. 2 and 3, the top wall portion 43 has a shape in which two U-shaped grooves 45 extending in the front-rear direction are arranged side by side along the width direction of the crimper 41 (a direction that is orthogonal to the direction in which the barrel pressing portion 42 extends). The portion positioned between the two U-shaped grooves 45 forms a projecting portion 46 projecting downward (toward the anvil 31) and extending so as to be continuous in the front-rear direction.

As shown in FIGS. 2 and 3, on the U-shaped grooves 45, each of the pair of side wall portions 44 is a wall portion extending from the end opposite to the other U-shaped groove 45 to the lower face 41U. The pair of side wall portions 44 are arranged so as to face each other.

Figure 4:
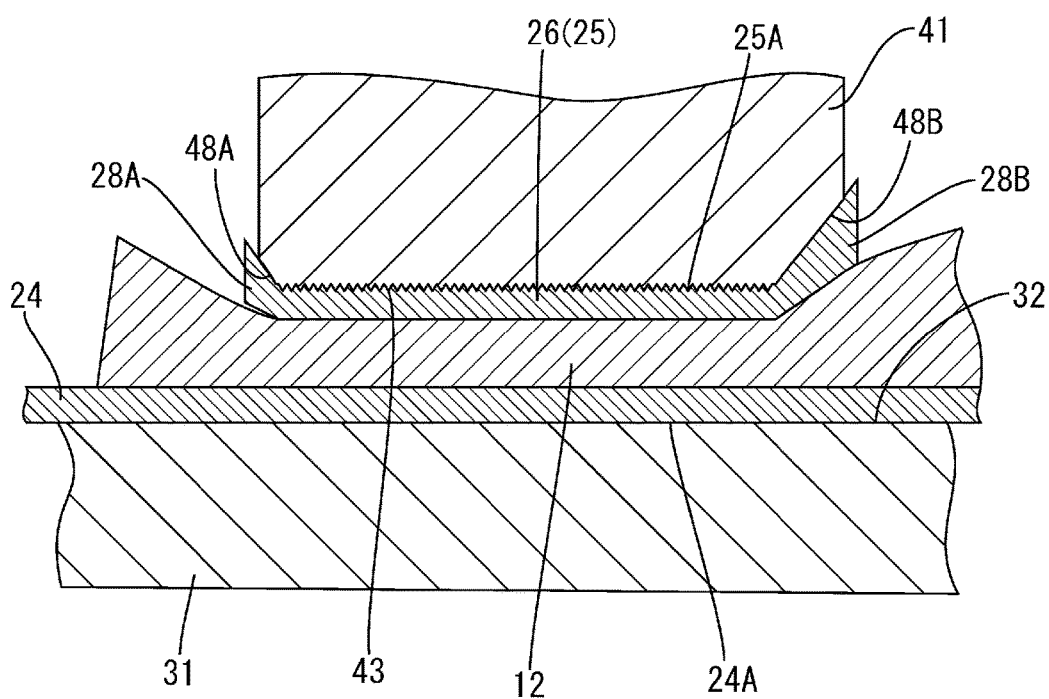
FIG. 4 is a partially enlarged cross-sectional view conceptually showing an electrical wire connection portion crimped to an electrical wire using the crimp tool of Embodiment 1.
Figure 5:
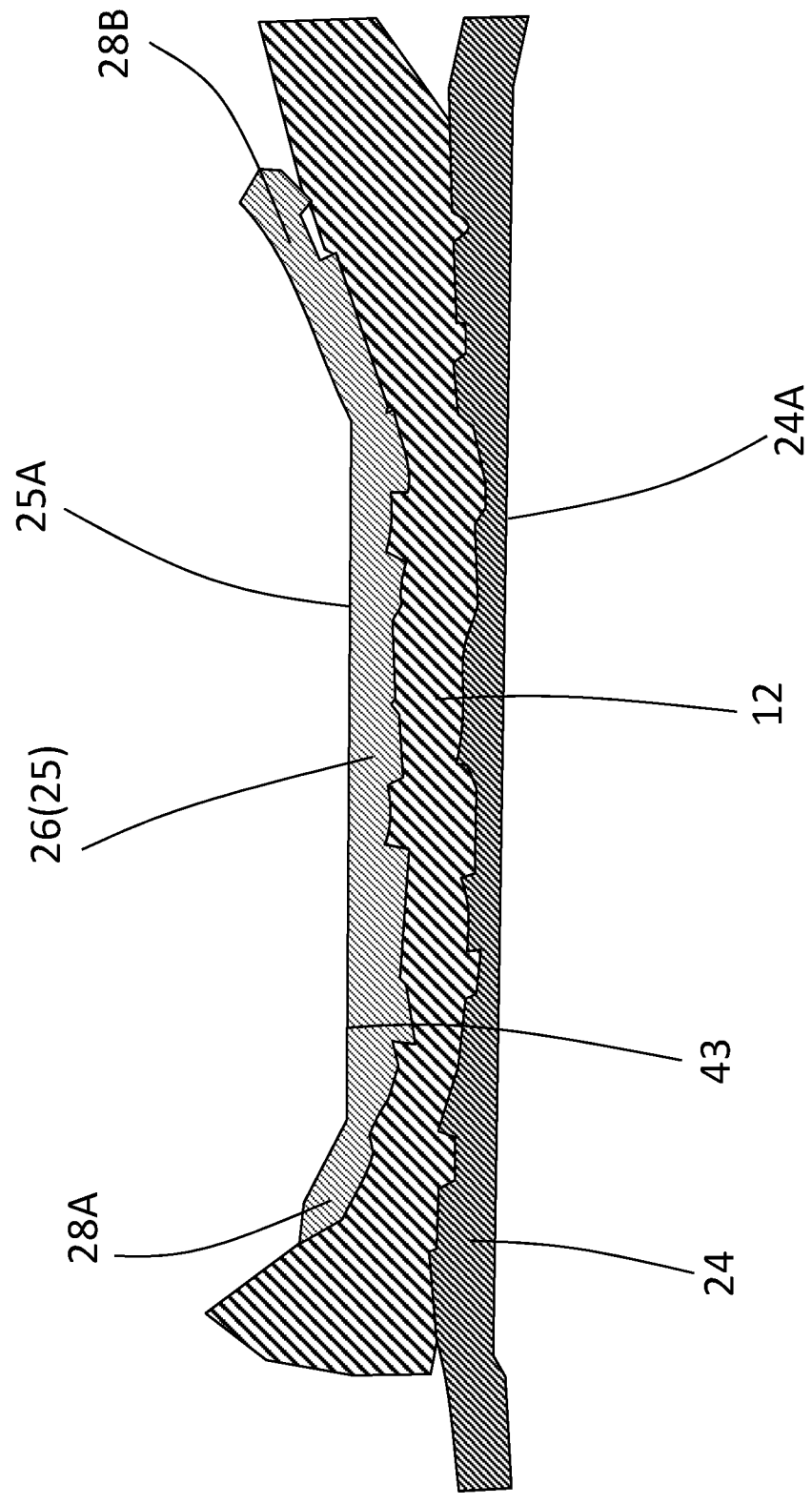
FIG. 5 is a partially enlarged cross-sectional view of an actual electrical wire connection portion in the embodiment.

As shown in FIGS. 2 and 4, the front tapered wall portion 48A of the two tapered wall portions 48A and 48B is a wall portion extending so as to spread outward to the front from the top wall portion 43 and the side wall portions 44. As shown in FIGS. 2 and 4, the rear tapered wall portion 48B is a wall portion extending so as to spread outward to the rear from the top wall portion 43 and the side wall portions 44.

In this embodiment, the surface of the top wall portion 43 is formed as a rough face having a surface roughness Ra2=1.0 μm through roughening (see FIG. 3).

Note that the surface roughness Ra in this embodiment is a center line average roughness as defined in Appendix of JIS B 0031 and JIS B 0061.

When crimping the female terminal 21 to the electrical wire 11 using the crimp tool 30, first, the insulating sheath 13 is stripped off at an end of the electrical wire 11, so that the core wire 12 is partially exposed. The electrical wire 11 (the core wire 12 and the insulating sheath 13) is arranged so as to extend in the front-rear direction along the bottom plate 24 of the female terminal 21 (a step of placing the core wire 12 on the bottom plate 24).

Next, the female terminal 21 on which the electrical wire 11 is placed is positioned and arranged on the placement face 32 of the anvil 31. The pair of wire barrels 25 are in the shape of flat plates before being crimped to the electrical wire 11, and stand upright from the bottom plate 24 toward the crimper 41 in an orientation of facing each other.

Then, the crimper 41 is lowered toward the wire barrels 25. Thus, the pair of wire barrels 25 are brought into contact with the side wall portions 44 and the top wall portion 43 of the crimper 41, and gradually curved from ends thereof into shapes that run along the top wall portion 43. When the crimper 41 is further lowered, the orientation of the ends of the wire barrels 25 changes to face toward the core wire 12, and the ends bite into the core wire 12. In this manner, the wire barrels 25 are crimped to the core wire 12 (a step of allowing the wire barrels 25 to surround the core wire 12 and be crimped to the core wire 12 using the crimp tool 30).

Hereinafter, the actions and effects of the foregoing embodiment will be described.

According to the foregoing embodiment, the surface roughness Ra2 (1.0 μm) of the top wall portion 43 of the crimper 41 is larger than the surface roughness Ra1 (0.05 μm) of the placement face 32 of the anvil 31, and thus, when the top wall portion 43 is brought into contact with the wire barrels 25, the top wall portion 43 is in close contact with the entirety of the wire barrels 25 in a state in which slipping is unlikely to occur due to the frictional force thereof compared with the placement face 32, and presses the entirety of the wire barrels 25 with a uniform force. Accordingly, the bottom plate 24 is prevented from being partially thin due to stress concentrated on the wire barrels 25 at portions thereof in contact with the front end and the rear end of the top wall portion 43, that is, the front end and the rear end of the main body portions 26, and thus it is possible to obtain a terminal-equipped electrical wire 10 of high quality (see FIG. 5).

Furthermore, the terminal-equipped electrical wire 10 of this embodiment is such that a surface roughness Ra3 of barrel outer faces 25A of the wire barrels 25 on the side opposite to the core wire 12 is larger than a surface roughness Ra4 of a bottom plate outer face 24A of the bottom plate 24 on the side opposite to the core wire 12 (Ra3>Ra4). This terminal-equipped electrical wire 10 is of high quality because the female terminal 21 is prevented from being partially thin.

Embodiment 2

Hereinafter, Embodiment 2 will be described with reference to FIGS. 6 and 7. In this embodiment, the same constituent elements as those in Embodiment 1 are denoted by the same reference numerals, and a description thereof has been omitted.

Figure 6:
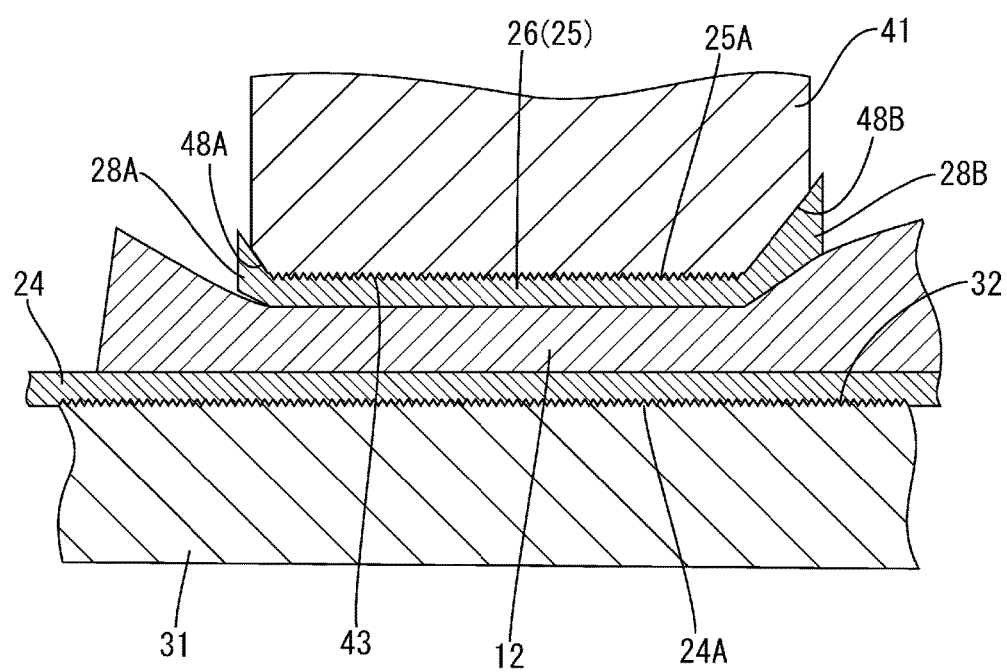
FIG. 6 is a partially enlarged cross-sectional view conceptually showing an electrical wire connection portion crimped to an electrical wire using a crimp tool of Embodiment 2.
Figure 7:
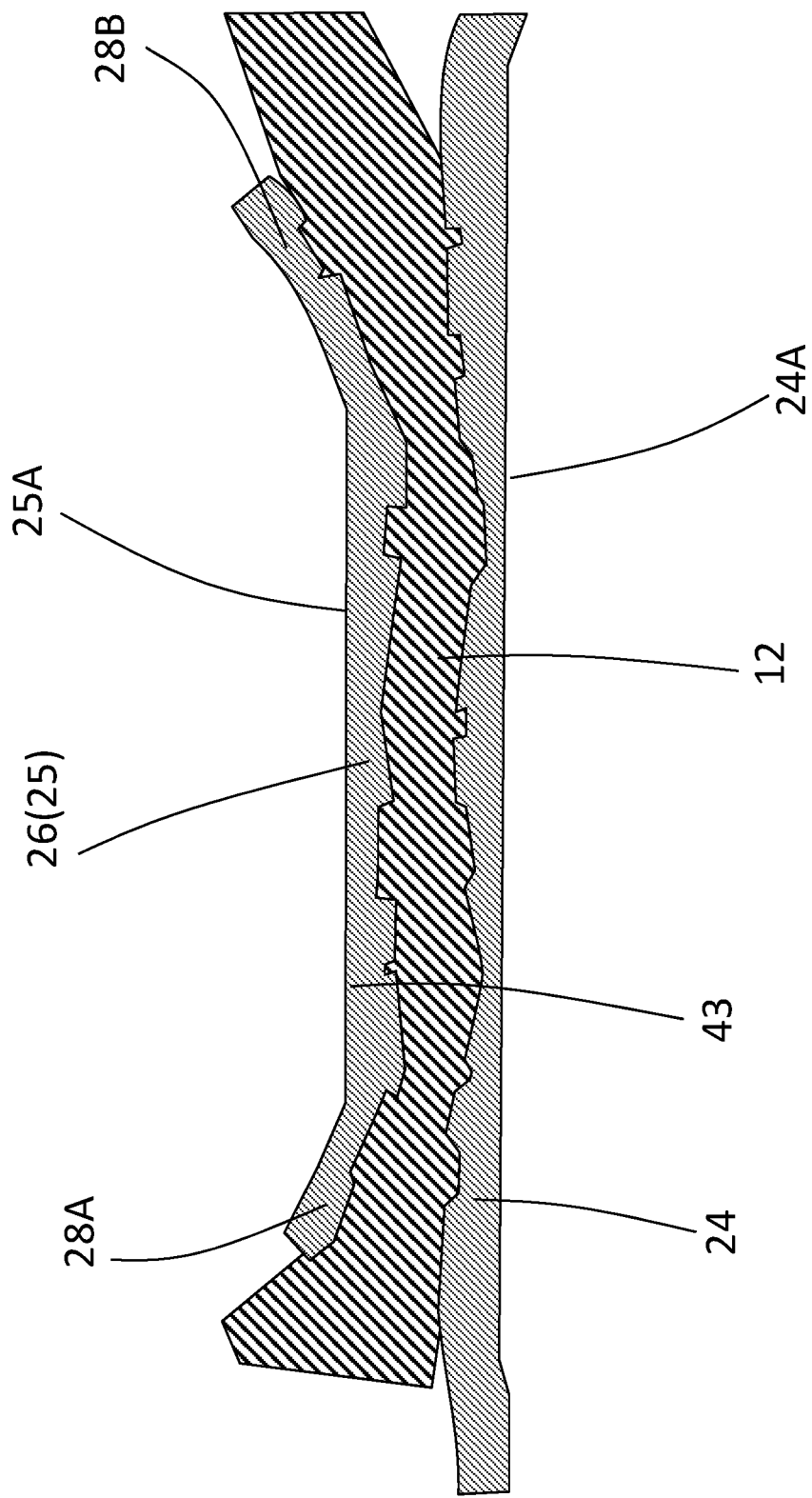
FIG. 7 is a partially enlarged cross-sectional view of an actual electrical wire connection portion in the embodiment.

The terminal-equipped electrical wire production method and the crimp tool in this embodiment are different from those in the foregoing embodiment in that the surface roughness Ra2 of the top wall portion 43 of the crimper 41 is the same as the surface roughness Ra1 of the placement face 32 of the anvil 31, and Ra1=Ra2=1.0 μm (see FIG. 6).

Even when the surface roughness Ra1 of the placement face 32 is the same as the surface roughness Ra2 of the top wall portion 43 as in this embodiment, if Ra1=Ra2=1.0 μm, these surface roughnesses are sufficiently larger than an ordinary surface roughness Ra=0.05 μm of conventional crimp tools, and thus slippage between the crimp tool and the wire barrels 25 is suppressed due to the frictional force thereof. Accordingly, the bottom plate 24 is prevented from being partially thin due to a large amount of stress being applied to portions of the female terminal 21, and thus it is possible to obtain a terminal-equipped electrical wire 10 of high quality (see FIG. 7).

Embodiment 3

Figure 8:
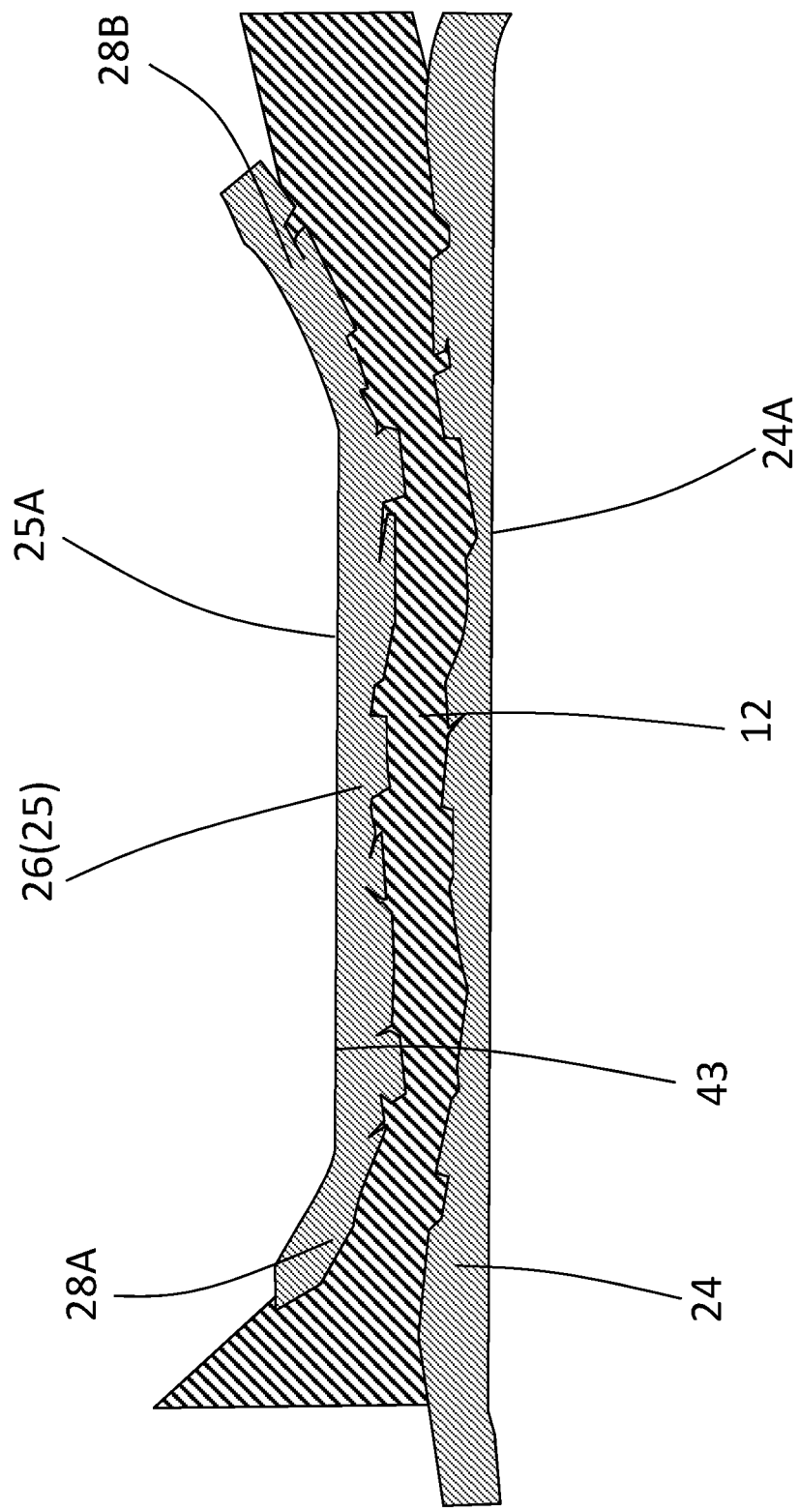
FIG. 8 is a partially enlarged cross-sectional view of an actual electrical connection portion crimped to an electrical wire using a crimp tool of Embodiment 3.
Figure 9:
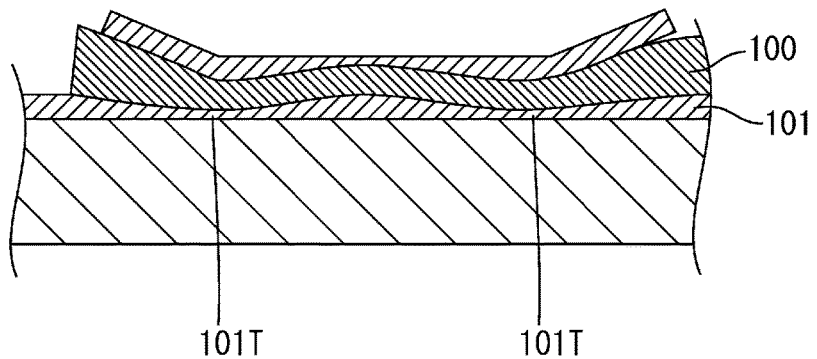
FIG. 9 is a partially enlarged cross-sectional view conceptually showing an electrical wire connection portion crimped to an electrical wire using a conventional crimp tool.

Embodiment 3 is almost the same as Embodiment 1, but is different from Embodiment 1 in the surface roughness Ra2 of the top wall portion 43. That is to say, in this embodiment, the surface roughness Ra2 of the top wall portion 43 is 0.2 μm, and the surface roughness Ra1 of the placement face 32 is 0.05 μm as in conventional examples. Also in Embodiment 3, the bottom plate 24 is prevented from being partially thin due to a large amount of stress being applied to portions of the female terminal 21, and thus it is possible to obtain a terminal-equipped electrical wire 10 of high quality (see FIG. 8).

Conclusion

Figure 10:
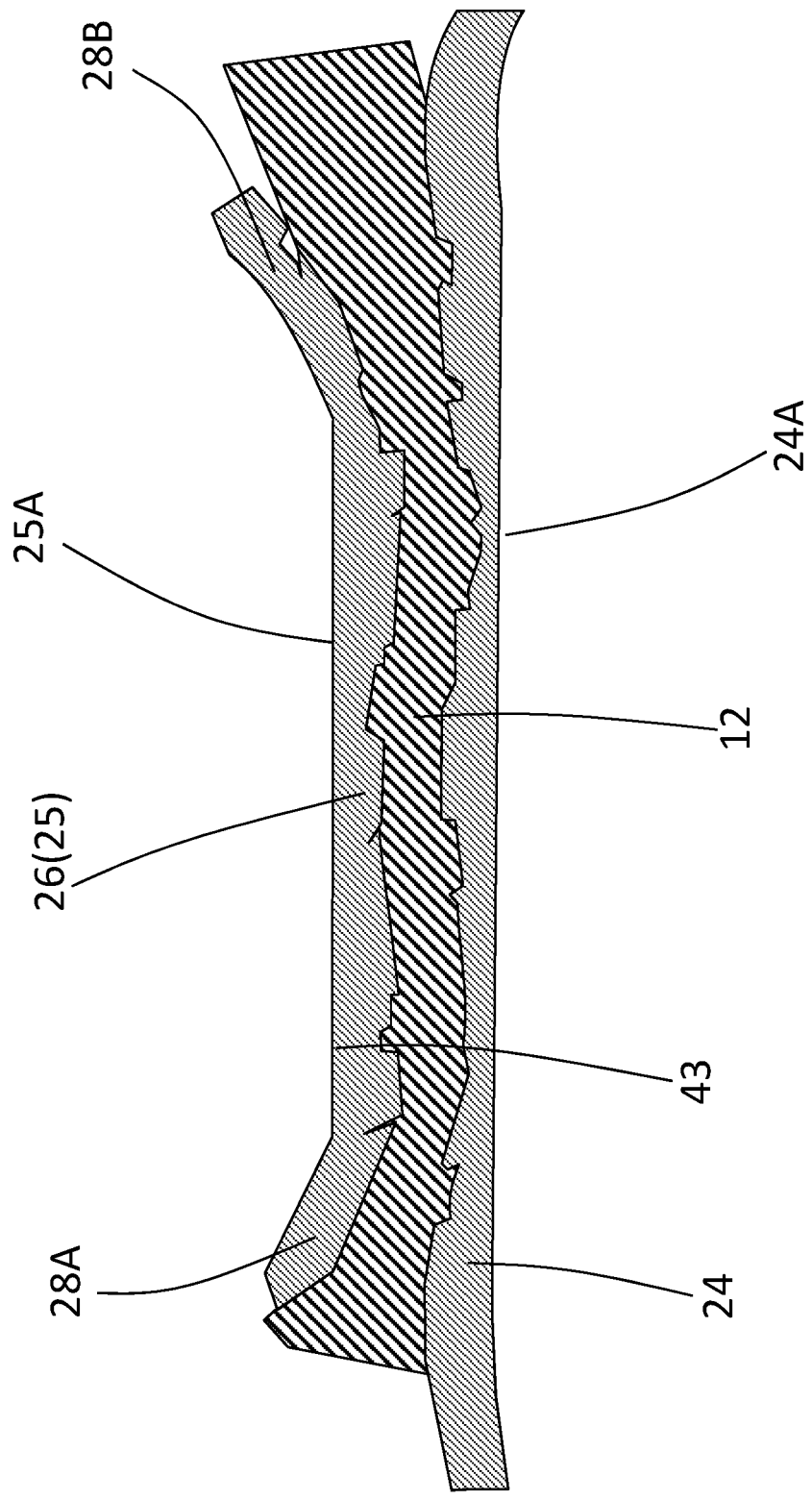
FIG. 10 is a partially enlarged cross-sectional view of an actual electrical wire connection portion in the embodiment.

In this manner, good results were achieved in all of Embodiments 1 to 3 above. That is to say, it was seen that, if the surface roughness Ra2 of the top wall portion 43 is 0.2≤Ra2≤1.0 μm, slippage between the crimp tool and the wire barrels 25 is suppressed due to the frictional force thereof, and it is possible to obtain a terminal-equipped electrical wire 10 of high quality. Note that, if Ra2 is smaller than 0.2 μm, sufficient effects of suppressing slippage may not be obtained due to an insufficient frictional force (see FIG. 10), and, if Ra2 is larger than 1.0 μm, the surface of the wire barrels may be made rough, and thus, it is preferable that 0.2≤Ra2≤1.0 μm.

Other Embodiments

The techniques disclosed in this specification are not limited to the embodiments described by way of the above descriptions and figures, and various modes such as the following, for example, are also encompassed.

Although the terminal that is crimped to the electrical wire 11 is the female terminal 21 that has the terminal connection portion 22 in the shape of a tube in the foregoing embodiment, there is no limitation to this, and the terminal may be a male terminal having a male tab, may be a so-called LA terminal in which a through hole is formed through a metal plate member, or may be a terminal with any other shape as necessary.

Although the electrical wire 11 has the core wire 12 made of aluminum or an aluminum alloy in the foregoing embodiment, the electrical wire may have a core wire made of copper, a copper alloy, or any other metal.

Although the female terminal 21 is made of a metal plate member made of copper or a copper alloy whose surface is tin-plated in the foregoing embodiment, there is no limitation to this. For example, the terminal may be made of a metal plate member made of a metal such as aluminum or an aluminum alloy. The metal plate member may be plated with tin, or may not be plated.

Although three types of combinations were shown as examples of a combination of the surface roughness Ra1 of the placement face 32 and the surface roughness Ra2 of the top wall portion 43 in the foregoing embodiment, the combinations and the sizes of Ra1 and Ra2 are not limited to those in the foregoing embodiment, and the effects can be expected even in the case where Ra2 is not 0.2≤Ra2≤1.0 μm, for example.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Terminal-equipped electrical wire
11 Electrical wire
12 Core wire
21 Female terminal
24 Bottom plate portion
25 Wire barrel
30 Crimp tool
31 Anvil (first tool)
32 Placement face
41 Crimper (second tool)
42 Top wall portion (curved face)
Ra1, R2 Surface roughness

The invention claimed is:

1. A production method for a terminal-equipped electrical wire in which a terminal including a bottom plate portion and a pair of wire barrels extending sideward from the bottom plate portion is crimped to a core wire exposed at an end of an electrical wire, comprising:
   a step of placing the core wire on the bottom plate portion; and
   a step of allowing the wire barrels to surround the core wire and be crimped to the core wire using a crimp tool, wherein the crimp tool includes a first tool having a placement face on which the bottom plate portion and the core wire are placed, and a second tool having a curved face for holding and curving the wire barrels between the curved face and the placement face, and
   a surface roughness Ra2 of the curved face is larger than a surface roughness Ra1 of the placement face (Ra2>Ra1).

2. The production method for a terminal-equipped electrical wire according to claim 1, wherein the surface roughness Ra2 of the curved face is 0.2≤Ra2≤1.0 μm.

3. A crimp tool for use in production of a terminal-equipped electrical wire in which a terminal including a bottom plate portion and a pair of wire barrels extending sideward from the bottom plate portion is crimped to a core wire exposed at an end of an electrical wire, the crimp tool for crimping the pair of wire barrels to the core wire, comprising:
   a first tool having a placement face on which the bottom plate portion and the core wire are placed; and
   a second tool having a curved face for curving the wire barrels between the curved face and the placement face, wherein a surface roughness Ra2 of the curved face is larger than a surface roughness Ra1 of the placement face (Ra2>Ra1).

4. The crimp tool according to claim 3, wherein the surface roughness Ra2 of the curved face is 0.2≤Ra2≤1.0 μm.

5. A terminal-equipped electrical wire in which a terminal including a bottom plate portion and a pair of wire barrels extending sideward from the bottom plate portion is crimped to a core wire exposed at an end of an electrical wire, the pair of wire barrels in a state of surrounding the core wire placed on the bottom plate portion are crimped to the core wire, and a surface roughness Ra3 of barrel outer faces of the wire barrels on a side opposite to the core wire is larger than a surface roughness Ra4 of a bottom plate outer face of the bottom plate portion on a side opposite to the core wire (Ra3>Ra4).

* * * * *